3,330,131
REFRIGERATOR WITH TRANSFORMER MEANS
Hermann Papst, St. Georgen, Black Forest, Germany
Filed July 2, 1964, Ser. No. 379,996
Claims priority, application Germany, July 10, 1963,
P 32,172
12 Claims. (Cl. 62—455)

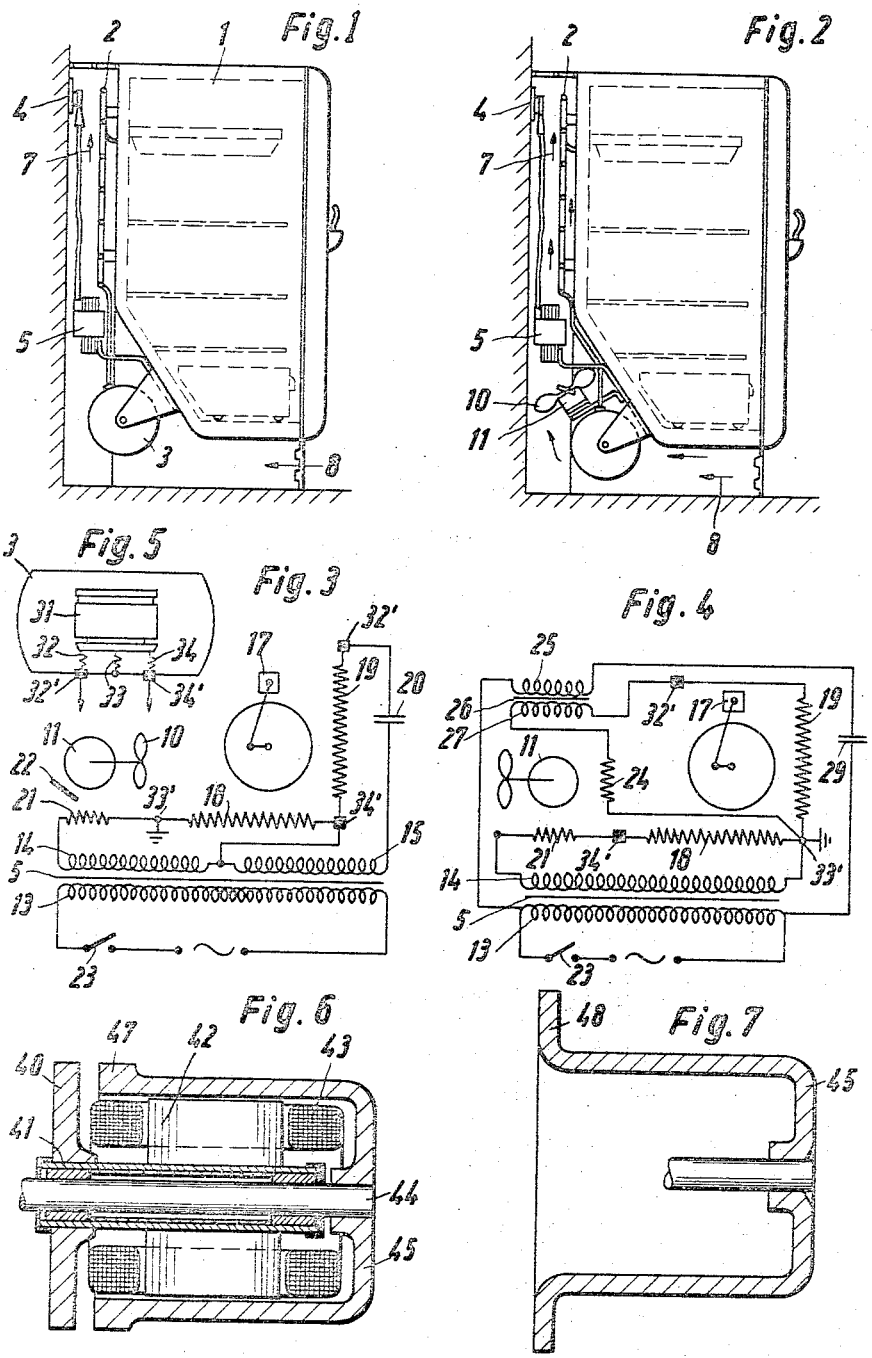

The present invention concerns cooling devices having a compressor and an electric motor to drive said compressor.

It is known that the heat produced by electrical losses in motors which are built into sealed refrigerator units is for the most part absorbed by the circulating refrigerant. These losses in the motor increase the temperature of the refrigerant and impose an additional load on the cooling circuit. The arrangement is reliable, however, owing to its frictionless and leak-free sealing.

Pump motors immersed in liquid have previously been fed by transformers arranged coaxially about them and having slotted windings. The stators of such motors have been formed as bar windings, which were connected with the secondary winding of a transformer likewise disposed in the slots of an annular laminated core. The primary section of the transformer was placed in a pressure-tight shell outside the refrigerator sealed unit. This arrangement costs almost as much as two motors and the transformers also act as sources of heat and increase the temperature of the refrigerant.

Other refrigerator motors have also been made with the rotor in a separate enclosure in the refrigerator casing, so that the stator surrounding the separate enclosure is no longer arranged in the cooling medium. These motors are, however, found to be unsuitable.

As it has been found that these requirements or desirable qualities are only unsatisfactorily met by the known arrangements it is the main object of the invention to improve the sealed-unit refrigerator by a particular arrangement and construction of a motor immersed in the refrigerant and of the components necessary for its operation.

It is a further object of this invention to provide an arrangement of the type mentioned which is comparatively simple in its structure and reliable in operation.

According to the present invention there is provided refrigerator means comprising within a sealed refrigerant circuit a compressor and an electric motor connected to drive said compressor, in which said motor is supplied with current from a transformer arranged in the neighbourhood of the portion of said sealed circuit containing said motor but externally thereto in such a manner that said transformer is intrinsically cooled and does not heat the refrigerant. Preferably the motor is of the type having only a single winding, so that a high space-factor of the winding is obtained which reduces the resistance of the stator winding so that the losses in the motor are substantially diminished and the efficiency is increased.

It is advantageous for the transformer and the motor pod of the refrigerator to be arranged in the air flow produced thermodynamically by the heat-exchanger of the refrigerator so that the air passes first over the pod and then over the transformer. This prevents in a simple and exceedingly efficient manner the heating of the pod by the transformer.

Even more advantageously, a fan may be provided, having an auxiliary motor suitably constructed as a splitpole motor, which is fed from the same transformer as the refrigerator driving motor. Since the additional blower motor is fed from the transformer which is present in any case, it may be fed at a very low voltage, so that the motor windings can be manufactured at low cost and also reliably.

In a preferred embodiment of the invention the stator winding of the blower motor is connected in series with the main winding of the driving motor for the refrigerator.

It is advantageous for the auxiliary winding of the refrigerator driving motor to be driven by way of a capacitor from an additional winding on the transformer. There may then be employed a bipolar electrolytic capacitor, such as may be usefully employed for low working voltages.

In an alternative embodiment of the invention there is employed an additional transformer, of which the primary winding is connected to the alternating-current mains supply in series with a capacitor and of which the secondary winding feeds both the auxiliary stator winding of the refrigerator driving motor and also the auxiliary stator winding of the fan motor. In this case the capacitor employed may be of a standard commercial type, and thus cheap. The working voltage applied to the main winding of the motor may be chosen independent of the working voltage of the capacitor. The phase shift for the auxiliary windings of the two motors is thus effected by one and the same capacitor.

In order to reduce the amount of heat released to the refrigerant by the driving motor, and thus to increase the useful cooling power of the cooling system (compressor, cold space, heat exchanger), it is advantageous for the refrigerator to be driven by a motor having a stator provided with slots closed by narrow slits of which the width is equal to not more than three times the radial length of the air-gap between stator and rotor, and of which the rotor is solid. Such a construction results in a radical reduction of the surface losses in the motor. As a result of the special construction of the stator, motors with solid rotors experience a surprising increase in efficiency and in power of some 33 to 50%, without increase in the power taken from the supply.

If the rotor of such a motor is constructed as an iron bell closed at one end, of which the open edge possesses an outwardly projecting rim, preferably formed as a flange ring, then it will be found that this form of construction is particularly suitable for two-pole motors. In such motors, owing to the special form of the bell, the eddy currents flow preferentially in the enlarged open rim and in the closed end, so that there results in the intermediate portion of the bell a substantial improvement of the electromagnetic coupling of the eddy currents with the stator field.

If the motor is fed by way of a transformer with a supply at low voltage but high current, then relatively heavy supply leads must be employed. In order to avoid breakage of these leads owing to the unavoidable vibration which occurs during operation, the current for the driving motor of the refrigerator is led through springs by means of which the motor is resiliently mounted to the pod of the refrigerator.

In order to keep the winding space factor in the slots as large as possible, and thus to keep the electrical losses in the motor as small as possible, it is helpful for the stator winding of the driving motor situated in the refrigerant to be insulated by means of oxidised aluminium foil or aluminium oxide layers. This type of insulation is very resistant to heat, has good thermal conductivity, is neutral to normal refrigerants, is mechanically very stable and can be used in very thin layers.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, from which all parts not essential to the understanding of the invention have been omitted. Parts in the several figures which correspond with one another are designated by the same reference numerals. The drawings comprise FIGURES 1 to 7, of which:

FIGURE 1 is a schematic diagram of a refrigerator illustrating the principle of the present invention, FIGURE 2 is a schematic diagram illustrating a modification of the invention, FIGURE 3 is a circuit diagram illustrating the electrical connections of the embodiment of the invention described in relation to FIGURE 2, FIGURE 4 is a circuit diagram of a modification of the apparatus described in relation to FIGURES 2 and 3, FIGURE 5 is a diagram ilustrating a detail of the apparatus described in relation to FIGURE 4, FIGURE 6 is an axial section through a form of electric motor suitable for use in carrying out the present invention, and FIGURE 7 shows a constructional detail of a modification of the motor described with reference to FIGURE 6.

The refrigerator according to the invention which is illustrated by FIGURE 1 comprises a cupboard-like cooled space 1. At the back of this enclosure is situated the heat-exchanger 2 which contains the refrigerant to be condensed. On condensation of the refrigerant heat is passed to the surrounding air. The compressor and the electrical motor which drives it are contained in a gastight pod 3, so that the motor is immersed in the refrigerant. The motor winding is fed from the alternating-current mains in the usual manner by way of a plug 4 and a transformer 5 which provides a low-voltage supply for the motor. As a result of this low voltage only a little insulation is necessary in the motor. This results in a high space-factor for the copper in the slots and produces a substantial reduction in the otherwise usual electrical losses in refrigerator driving motors. It has been found that the electrical losses resulting in the transformer 5 are substantially smaller than the reduction of the electrical losses in the motor which results from the construction of the motor for a very low supply voltage.

A point which must be taken into consideration is that all the heat produced by losses in the motor must be led away by the refrigerant. Any reduction in the motor losses therefore is reflected in a corresponding reduction in the cooling power necessary in the refrigerator and thus in a reduction in the compressor loading, so that in turn the driving power required for the compressor is reduced, so that the power fed to the motor is lower.

In order, however, to obtain the advantages mentioned above as resulting from the use of a lower supply voltage for the refrigerator drive motor, it is essential that the heat resulting from losses in the transformer shall not increase the temperature of the pod containing the motor and the compressor.

In the embodiment of the invention illustrated by FIGURE 1 the heat-exchanger 2 is disposed in an air channel up which a thermally induced current of air flows. The heat yielded up by the heat-exchanger heats the ambient air and produces a flow in the direction of arrow 7. The air thus displaced is replaced by a flow of air from below, in the direction indicated by arrow 8. Since the aperture through which air may enter is usually situated in the neighbourhood of the floor, the air drawn in will be relatively cool. A flow of air is thus set up in the direction from the pod 3 to the transformer 5. Any transfer of heat resulting from transformer losses to the cold pod is thus substantially prevented.

The embodiment of the invention illustrated by FIGURE 2 is generally similar to that already described. Here, however, the flow of air is increased by an additional fan 10. The fan is driven by its own small motor 11, which likewise is fed from transformer 5.

FIGURE 3 shows schematically the electrical connections of the embodiment of the invention described with reference to FIGURE 2. The primary winding 13 of the transformer 5 is fed from the alternating-current mains. There are two secondary windings 14 and 15, one end of winding 14 being connected to that of winding 15. The electric driving motor for the compressor indicated at 17 has in its stator two windings, a main winding 18 and an auxiliary winding 19. The latter winding is, in known manner, fed by way of a capacitor 20 with a current which has undergone a shift in phase as compared with that in the main winding 18. The amplitude of the voltage supplied by winding 15 is independent of the voltage of coil 14.

The main winding 18 of the driving motor is connected in series with a winding 21 in the stator of motor 11 which drives the fan 10. Windings 18 and 21 are fed from secondary winding 14 of the transformer. Motor 11 is of the type known as a split-pole motor and includes a short-circuited winding 22. Secondary winding 15 is preferably designed for a higher voltage than secondary winding 14 in order to be able to supply the auxiliary winding 19 by way of a bipolar electrolytic capacitor of a normal commercial type.

A switch 23 in the primary circuit of the transformer is turned on whenever the temperature in the interior of the cooled space 1 rises above a predetermined value, and is turned off when the temperature passes below a lower limiting value. When switch 23 is closed, both the driving motor for compressor 17 and also driving motor 11 for fan 10 are supplied with current. The energy required by motor 11 is very much less than that needed for the compressor driving motor, and since the main windings of both motors are traversed by the same current a very much lower voltage drop arises across winding 21 of motor 11 than across winding 18 of the compressor drive motor. The insulation on winding 21 need therefore be only very slight. The motor may therefore be constructed very cheaply.

FIGURE 4 shows a modification of the circuit arrangement described above in relation to FIGURE 3. As in FIGURE 3, the main windings 21 and 18 of the two motors are fed from a secondary winding 14 of a transformer. Here, however, the auxiliary winding 19 of the driving motor for compressor 17 and the auxiliary winding 24 for the driving motor 11 of fan 10 are fed from the secondary winding 27 of an additional transformer 26, of which the primary winding 25 is fed by way of a capacitor 29 with a current correspondingly shifted in phase. A particular advantage of this arrangement resides in the fact that the auxiliary windings 19 and 24 may also be designed for small supply voltages, and that a commercial type of capacitor, designed for the standard supply voltage and therefore advantageously priced, may be used for capacitor 29.

In FIGURE 5 it is shown schematically how the driving motor 31 situated in the pod 3 is resiliently mounted by means of springs 32, 33 and 34. All three springs serve as leads to supply current to the motor. Springs 32 and 34 are insulated from pod 3 and the current is led to them by way of lead-through insulators 32' and 34' respectively. Spring 33 is connected directly to the pod. This connection is indicated in FIGURES 3 and 4 by reference 33'.

A motor with a high starting torque must be used to drive the compressor 17. As already explained, the motor should have losses as low as possible, and thus possess a high efficiency. It is therefore suitable to employ as the driving motor a slotless, external-rotor motor, such as is schematically illustrated in axial section by FIGURE 6. The motor consists in its essentials of a flange member 40 from which projects at right angles a tubular member 41 carrying the laminated stator 42 with its winding 43. In tube 41 is mounted for rotation a shaft 44, on which is secured a massive rotor 45. This consists of a pressed or drawn bell of low-carbon iron with relatively high conductivity.

When constructed as two-pole motors, motors of this kind have a particularly high efficiency if the bell is enlarged at its open end, since a particularly suitable distribution of the eddy currents in the bell then results. The enlargement of the margin of the bell may be effected by forming it with a thickened rim 47, which may be produced during pressing.

FIGURE 7 shows a somewhat modified form of the bell 45 for a motor as described above in relation to FIGURE 6. Here the bell is provided during drawing with an outwardly projecting flange 48. This results in improved cooling of the bell, since the flange radially projecting outwards flings air away owing to friction and centrifugal force.

While the invention has been illustrated and described as embodied in some special arrangements, it is not intended to be limited to the details shown, since various modifications and structural changes may be made without departing in any way from the spirit of the present invention.

What is claimed as new and described to be secured by Letters Patent is:

1. A cooling device comprising a closed refrigerant circuit including a compressor and a heat exchanger inducing an air flow; a motor driving said compressor and cooled by the refrigerant in said closed refrigerant circuit; a fan operable to direct a flow of air over said heat exchanger; a drive motor for said fan; a transformer having a primary winding connectable to an alternating current supply and a secondary winding providing a small alternating voltage, said transformer being positioned in the path of said air flow nearer to said heat exchanger than said compressor; connections from said secondary winding of said transformer to said compressor drive motor and to said fan drive motor.

2. A cooling device comprising, in combination: means forming a space to be cooled; a heat absorber in said space; a heat exchanger exposed to ambient air; flow and return conduits connecting said heat absorber with said heat exchanger to form a sealed refrigerant circuit; a refrigerant in said circuit; a pod in said flow conduit; a compressor in said pod arranged when operated to urge said refrigerant from said heat absorber to said heat exchanger; an expansion valve in said return conduit; an electric motor in said pod, having main and auxiliary windings, connected to drive said compressor; a first transformer having a higher-voltage primary winding and a lower-voltage secondary winding; means for supplying said primary winding with alternating current; a fan arranged when operated to induce a flow of air about said heat exchanger; a further motor driving said fan, said further motor having main and auxiliary windings; a series circuit comprising said secondary winding of said first transformer, said main winding of said auxiliary motor and said main winding of said compressor drive motor; a second transformer having a higher-voltage primary winding and a lower-voltage secondary winding; a capacitor; connections from said primary winding of said first transformer by way of said capacitor to said primary winding of said second transformer; and a series circuit comprising said secondary winding of said second transformer, said auxiliary winding of said further motor and said auxiliary winding of said compressor drive motor; said transformers being so positioned that heat developed therein does not substantially pass to said refrigerant circuit.

3. A cooling device comprising, in combination, means forming a space to be cooled; a heat absorber in said space; a heat exchanger exposed to ambient air; flow and return conduits connecting said heat absorber with said heat exchanger to form a sealed refrigerant circuit; a refrigerant in said circuit; a pod in said flow conduit; a compressor in said pod arranged when operated to urge said refrigerant from said heat exchanger to said heat absorber; an expansion valve in said flow conduit; an electric motor in said pod connected to said compressor for driving the latter, said motor having a winding having a high space factor; a transformer located adjacent said pod and having a primary winding and a low voltage secondary winding connected to said winding of said motor, said transformer being so positioned that heat developed therein will substantially not be transmitted to said pod; and means for supplying said primary winding with alternating current.

4. A cooling device according to claim 3 in which said heat exchanger induces a thermodynamic flow of air and in which said transformer is positioned in the path of said air flow nearer to said heat exchanger than is said pod.

5. A cooling device according to claim 3 and comprising also a fan arranged when operated to induce a flow of air about said heat exchanger; a further motor driving said fan, said further motor having main and auxiliary windings; and connexion from said secondary winding of said transformer to said main winding of said further motor.

6. A cooling device according to claim 3 in which said motor includes a stator winding, said winding being insulated by means of aluminium oxide.

7. A cooling device comprising, in combination, means forming a space to be cooled; a heat absorber in said space; a heat exchanger exposed to ambient air; flow and return conduits connecting said heat absorber with said heat exchanger to form a sealed refrigerant circuit; a refrigerant in said circuit; a pod in said flow conduit; a compressor in said pod arranged when operated to urge said refrigerant from said heat absorber to said heat exchanger; an expansion valve in said return conduit; an electric motor in said pod connected to said compressor for driving the latter, said motor having a winding; a transformer located adjacent said pod and having a primary winding and a low voltage secondary winding, said transformer being so positioned that heat developed therein will substantially not be transmitted to said pod; means for supplying said primary winding with alternating current; a fan arranged when operated to induce a flow of air about said heat exchanger; a further motor driving said fan and having a winding; and a series circuit comprising said winding of said motor and of said further motor and connected to said secondary winding of said transformer.

8. A cooling device comprising, in combination, means forming a space to be cooled; a heat absorber in said space; a heat exchanger exposed to ambient air; flow and return conduits connecting said heat absorber with said heat exchanger to form a sealed refrigerant circuit; a refrigerant in said circuit; a pod in said flow conduit; a compressor in said pod arranged when operated to urge said refrigerant from said heat absorber to said heat exchanger; an expansion valve in said return conduit; an electric motor in said pod connected to said compressor for driving the latter, said motor having a main winding and an auxiliary winding; a transformer located adjacent said pod and having a primary winding and a low voltage secondary winding connected to said main winding of said motor, and an auxiliary winding, said transformer being so positioned that heat developed therein will substantially not be transmitted to said pod; means for supplying said primary winding with alternating current; a capacitor; and a series circuit comprising said auxiliary winding of said transformer, said capacitor and said auxiliary winding of said motor.

9. A cooling device comprising, in combination, means forming a space to be cooled; a heat absorber in said space; a heat exchanger exposed to ambient air; flow and return conduits connecting said heat absorber with said heat exchanger to form a sealed refrigerant circuit; a refrigerant in said circuit; a pod in said flow conduit;

a compressor in said pod arranged when operated to urge said refrigerant from said heat absorber to said heat exchanger; an expansion valve in said return conduit; an electric motor in said pod connected to said compressor for driving the latter, said motor having a winding; a transformer located adjacent said pod and having a primary winding and a low voltage secondary winding connected to said winding of said motor, said transformer being so positioned that heat developed therein will substantially not be transmitted to said pod; means for supplying said primary winding with alternating current; and resilient means mounting said motor within said pod, said resilient mounting means serving also to conduct electric current to said motor.

10. A cooling device comprising, in combination, means forming a space to be cooled; a heat absorber in said space; a heat exchanger exposed to ambient air; flow and return conduits connecting said heat absorber with said heat exchanger to form a sealed refrigerant circuit; a refrigerant in said circuit; a pod in said flow conduit; a compressor in said pod arranged when operated to urge said refrigerant from said heat absorber to said heat exchanger; an expansion valve in said return conduit; an electric motor in said pod connected to said compressor for driving the latter, said motor comprising a stator and a rotor separated by a radial air gap, said stator having winding slots narrowing to slits having a width not exceeding three times the radial length of said air gap and a winding in said slots, said rotor consisting of a unitary conductive, ferromagnetic structure; a transformer located adjacent said pod and having a primary winding and a low voltage secondary winding connected to said winding of said motor, said transformer being so positioned that heat developed therein will substantially not be transmitted to said pod; and means for supplying said primary winding with alternating current.

11. A cooling device comprising, in combination, means forming a space to be cooled; a heat absorber in said space; a heat exchanger exposed to ambient air; flow and return conduits connecting said heat absorber with said heat exchanger to form a sealed refrigerant circuit; a refrigerant in said circuit; a pod in said flow conduit; a compressor in said pod arranged when operated to urge said refrigerant from said heat absorber to said heat exchanger; an expansion valve in said return conduit; an electric motor in said pod connected to said compressor for driving the latter, said motor comprising a rotor and a stator separated by a radial air gap, said stator having a winding, said rotor comprising a unitary, general cylindrical structure having a closed end and an open end, said open end of said rotor being provided with a thickened rim; a transformer located adjacent said pod and having a primary winding and a low voltage secondary winding connected to said winding of said motor, said transformer being so positioned that heat developed therein will substantially not be transmitted to said pod; and means for supplying said primary winding with alternating current.

12. A cooling device comprising, in combination, means forming a space to be cooled; a heat absorber in said space; a heat exchanger exposed to ambient air; flow and return conduits connecting said heat absorber with said heat exchanger to form a sealed refrigerant circuit; a refrigerant in said circuit; a pod in said flow conduit; a compressor in said pod arranged when operated to urge said refrigerant from said heat absorber to said heat exchanger; an expansion valve in said return conduit; an electric motor in said pod connected to said compressor for driving the latter, said motor comprising a rotor and a stator separated by a radial air gap, said stator having a winding, said rotor comprising a unitary, general cylindrical member having a closed end and an open end, said open end being provided with an outwardly directed flange; a transformer located adjacent said pod and having a primary winding and a low voltage secondary winding connected to said winding of said motor, said transformer being so positioned that heat developed therein will substantially not be transmitted to said pod; and means for supplying said primary winding with alternating current.

References Cited

UNITED STATES PATENTS 2,169,115   8/1939   Steenstrup _____ 62—455

MEYER PERLIN, *Primary Examiner.*